Aug. 21, 1951  J. W. FOLEY  2,565,070
ROLLER BEARING
Filed Feb. 18, 1950  2 Sheets-Sheet 1
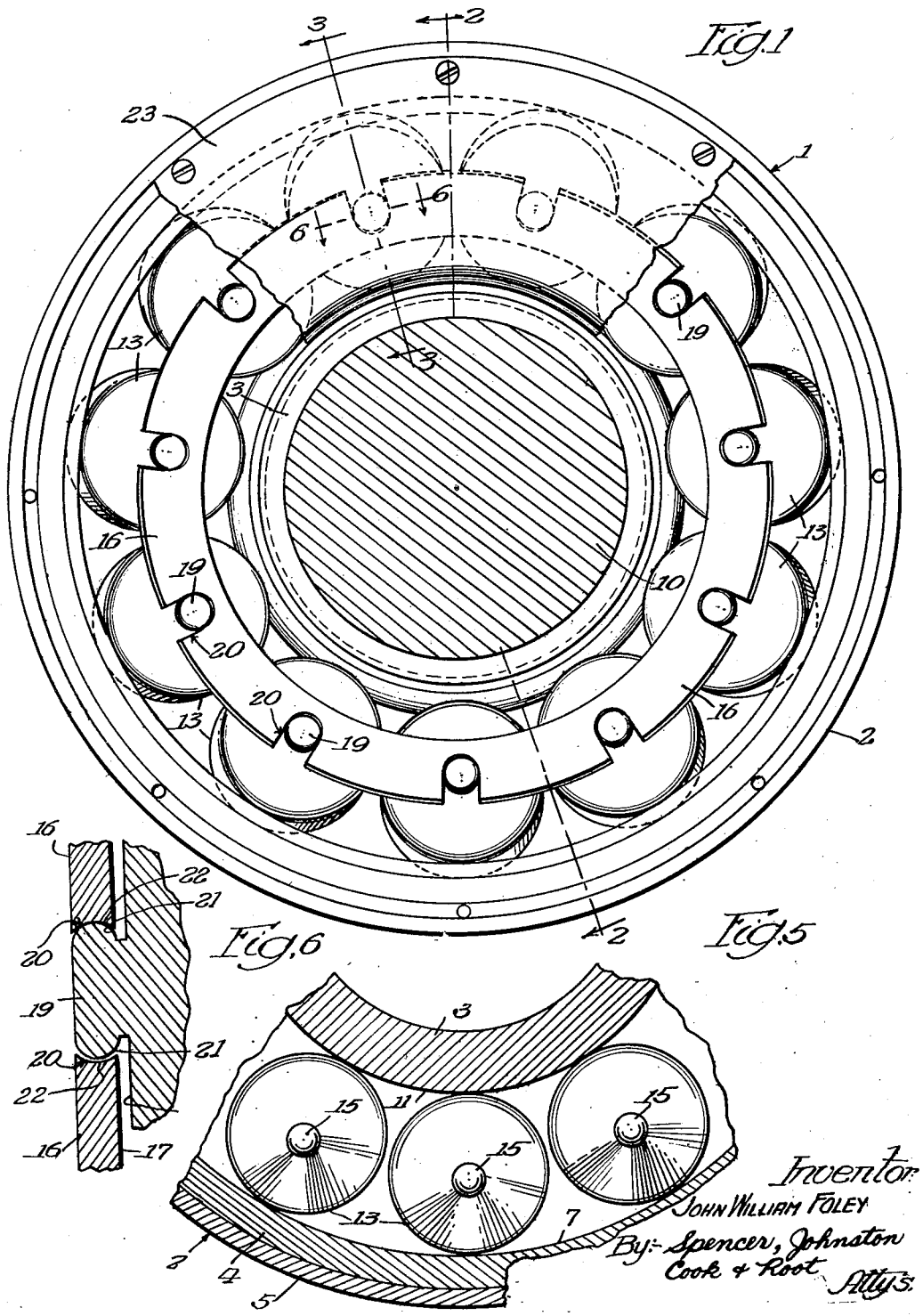
Inventor
JOHN WILLIAM FOLEY
By: Spencer, Johnston
Cook & Root
Attys.

Aug. 21, 1951   J. W. FOLEY   2,565,070
ROLLER BEARING
Filed Feb. 18, 1950   2 Sheets-Sheet 2
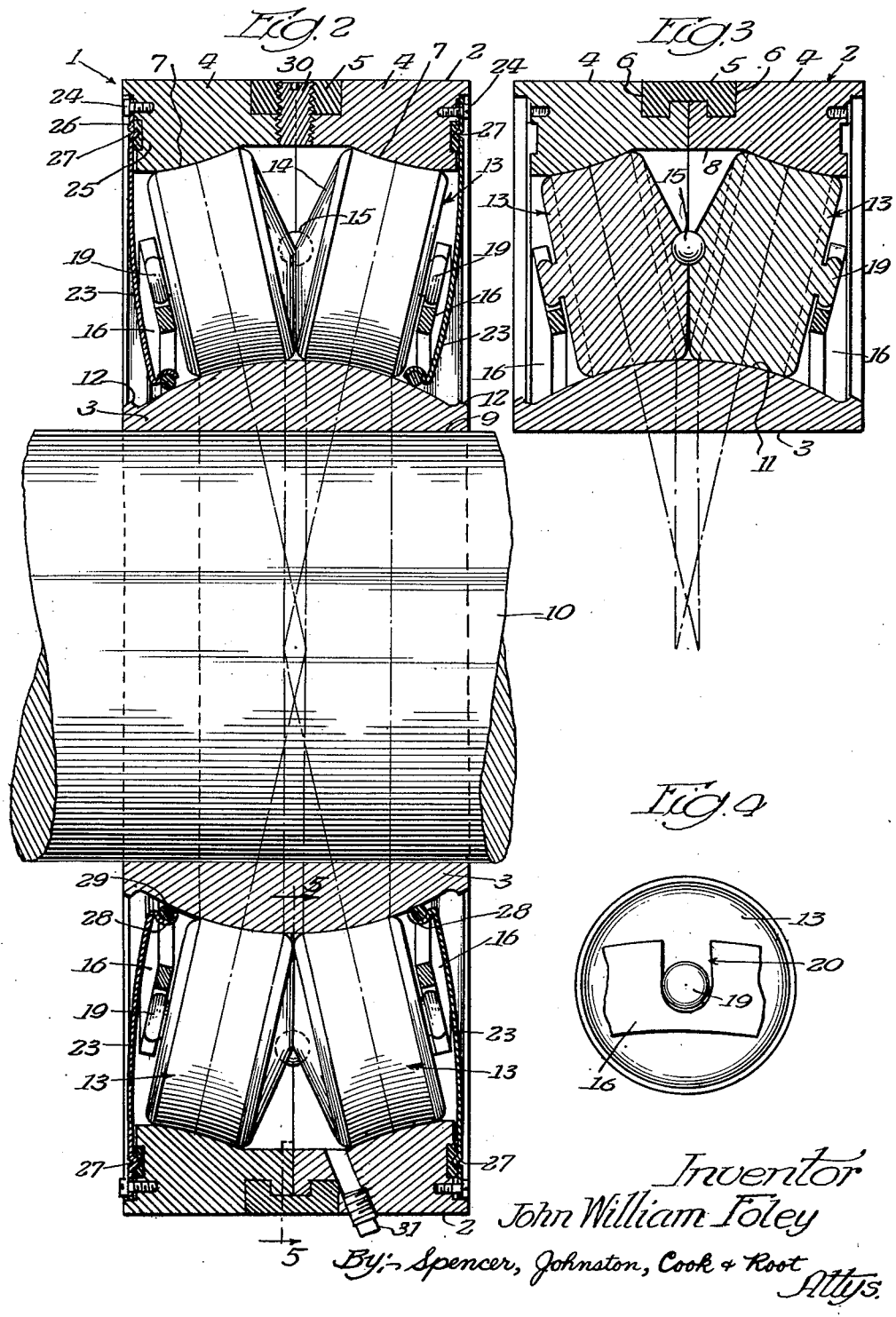

Patented Aug. 21, 1951

2,565,070

UNITED STATES PATENT OFFICE 2,565,070

ROLLER BEARING

John William Foley, Chicago, Ill.

Application February 18, 1950, Serial No. 144,886

4 Claims. (Cl. 308—214)

This invention relates to anti-friction bearings, and more particularly to bearings of the type known as roller bearings.

An important object of the invention is to provide a roller bearing which is constructed in a manner such that there will be a minimum amount of frictional contact between the various movable parts of the bearing.

Another important object of the invention is to provide a roller bearing which is adapted for withstanding large axial and radial loads, and which is especially adapted for use with shafts which rotate at relatively high speeds.

Numerous other objects and advantages of the invention will be apparent throughout the progress of the specification which follows.

The accompanying drawings illustrate a selected embodiment of the invention, and the views therein are as follows:

Fig. 1 is a side elevation of a roller bearing embodied in the invention;

Fig. 2 is a transverse section on line 2—2 of Fig. 1;

Fig. 3 is a detail section on line 3—3 of Fig. 1;

Fig. 4 is a fragmentary side view showing the manner in which a hub portion of a load carrying roller is received by a slot in one of the retainer members;

Fig. 5 is a fragmentary section on line 5—5 of Fig. 2; and

Fig. 6 is an enlarged fragmentary section on line 6—6 of Fig. 1.

The particular embodiment herein shown for the purpose of describing the invention comprises a bearing 1 (Fig. 1) which embodies an outer race ring 2 and an inner race ring 3. The outer race ring 2 is preferably constructed in two parts 4, 4 which are secured together in any suitable manner, such as by means of a channel-shaped ring of ductile material 5 seated in recesses 6 which are provided in each of the parts 4, 4 (Fig. 2). Each of the outer race ring parts 4 is provided with a convex bearing surface 7 which, from its inner edge, inclines downwardly or toward the central axis of the outer race ring 2. The convex bearing surfaces 7, 7 terminate short of each other, as shown in Figs. 2 and 3, to provide a flat surface 8 between the inner edges of the two said bearing surfaces.

The inner race ring 3 is preferably formed of a single piece of material, as shown in Figs. 2 and 3, but may, if desired, be of a sectional construction wherein the parts or sections are suitably secured together. The inner race ring 3 is provided with a central or axial opening 9 through which a shaft or axle 10 may pass. The periphery of the inner race ring 3 is rounded or curved transversely to provide a spherical convex bearing surface 11. The center of curvature of this spherical bearing surface is at the axial and diametrical center of the inner race ring. The bearing surface 11 merges at its opposite ends into thrust shoulders 12, 12 which are disposed adjacent the respective outer lateral faces of the inner race ring 3.

The inner race ring 3 is spaced radially inwardly from the outer race ring 2 to provide a space therebetween in which load-carrying rollers 13 are positioned. These rollers 13 are substantially in the form of half spools, that is, the axial length of any one of the rollers 13 is considerably less than the average diameter of that roller. Each of the rollers 13 is provided with a concave peripheral bearing surface and is shaped so that the diameter of the roller at the inner end of its peripheral bearing surface is greater than the diameter of the roller at the outer end of said surface. The load-carrying rollers 13 are arranged in pairs, one roller in each pair having peripheral rolling contact with one of the bearing surfaces 7 and with the spherical convex bearing surface 11, and the other roller in the same pair having peripheral rolling contact with the other bearing surface 7 and with the surface 11. Therefore, there are two rows or series of rollers 13 between the inner and outer race rings. One row or series of rollers 13 is arranged on one side of that plane which passes through the transverse center of the bearing 1, and the other row or series of rollers 13 is arranged on the other side of the said plane. Also, the rollers 13 are inclined downwardly toward the axis of the bearing from the aforementioned plane.

The inner end of each load-carrying roller 13 is shaped to form a conical surface, as indicated at 14. Since the two rollers in each of the roller pairs are disposed at an angle to each other, portions of the conical surfaces 14 of these rollers contact each other, as shown in Figs. 2 and 3, whereby the two said rollers roll against each other whenever they are caused to roll between the outer race ring 2 and the inner race ring 3. The apex of the conical end of each roller is recessed to form a socket for a ball 15, the balls 15 functioning to keep the two rollers in each pair in alignment with each other.

The several pairs of rollers 13 are maintained in spaced-apart relationship, in a circumferential sense, by means of two annular retainer rings 16, 16 (Figs. 1, 2 and 3) which are arranged at opposite sides of the bearing and between the inner and outer race rings. Each retainer ring 16 slants inwardly at an angle from its outer peripheral edge so that its inner face 17 is substantially parallel to the outer lateral faces 18 of the rollers adjacent thereto. Each roller 13 is considerably reduced in diameter at its outer end to form a hub portion 19 which projects outwardly through one of a plurality of radial inwardly extending slots or recesses 20 provided in the retainer ring adjacent thereto.

The periphery of each hub portion 19 is rounded transversely to provide a convex surface 21 adapted to have sliding point-contact with one of the spaced parallel concave sides 22, 22 of the particular slot or recess 20 through which the said hub portion extends. The concavities of the slot sides 22, 22 are formed on a curve having a radius of curvature slightly larger than that of the convex surfaces 21 of the hub portions 19 (see Fig. 6), and the maximum spacing between any pair of slot sides 22, 22 is slightly greater than the maximum diameter of a hub portion 19. Furthermore, the convex peripheral surfaces 21 of the hub portions 19 do not touch the retainer members at the bottom of the slots or recesses 20, but are spaced therefrom (see Fig. 4). The arrangement is such that when any of the pairs of rollers 13 approaches or moves away from the pressure points of the bearing (these pressure points being normally at the top and bottom of the bearing), the peripheral convex surfaces 21 of the hub portions on these rollers will have one-point contact with only one of the two concave slot sides 22, 22 associated with each of said hub portions. At no time is there ever more than one-point sliding contact between any hub portion 19 and the retainer ring 16 associated therewith. This provision of means for attaining one-point sliding contact between any hub portion and the retainer ring corresponding therewith is a salient feature of the invention because, by the provision of such means, sliding friction between the spaced roller pairs and the retainer members for spacing said roller pairs is considerably minimized.

It is highly desirable that the bearing 1 be properly lubricated in order that it may operate smoothly under load. Means are therefore provided for enclosing oil or other lubricant in the bearing so that the rollers 13 and retainer rings 16, 16 may roll and rotate in a bath of oil. Such means includes a pair of annular cover discs or plates 23, 23 extending between the outer and inner race rings. These cover discs or plates are fastened, preferably by means of machine screws 24, to the outer lateral faces of the outer race ring 2 (see Fig. 2). A recess 25 is formed in each of the aforesaid lateral faces to provide a seat in which a gasket or sealing ring 26 is mounted. The gaskets or sealing rings 26, 26 may be made of any suitable resilient material, such as cork, rubber or the like. An inwardly projecting bead 27 may be stamped into each of the cover plates or discs 23 for squeezing or forcing the gaskets or sealing rings 26 tightly into the recesses 25 when the machine screws 24 are tightened so that there will be no leakage of oil around the gaskets or sealing rings 26. The inner peripheral edge of each cover plate 23 is bent into a channel-shaped formation, as indicated at 28, to provide means for holding a sealing ring 29 which slidingly engages the spherical convex bearing surface 11 of the inner race ring 3. The sealing rings 29 may be made of felt, wicking or any other suitable material, and serve to prevent any outward leakage of oil along the bearing surface 11 of the inner race ring.

Oil may be introduced into the bearing by way of an opening normally closed by a filler plug 30 in the upper part of the outer race ring and may be drained from the bearing by way of an opening normally closed by a drain plug 31 in the lower part of the outer race ring 2 (Fig. 2). When the bearing is filled with oil, all of the various bearing surfaces will be covered with oil, whereby friction may be reduced to a minimum between the several coacting parts when the bearing is in use.

The invention provides a bearing which includes a plurality of pairs of load-carrying rollers maintained in circumferentially spaced-apart relationship by means of a pair of retaining members or rings. Novel means are provided for reducing friction between the retaining members and the rollers to a minimum. The bearing is efficient in operation, is strong and durable in construction and is capable of withstanding relatively large axial and radial loads. The bearing is especially adapted for use with shafts which rotate at relatively high speeds.

Changes may be made in the form, construction and arrangement of parts without departing from the spirit of the invention, and the right is hereby reserved to make all such changes as fall fairly within the scope of the claims which follow.

The invention is hereby claimed as follows:

1. In a roller bearing having inner and outer race rings, a plurality of pairs of rollers arranged between said race rings, the rollers in each pair being mounted side by side and having rolling contact with each other at their inner ends, a pair of retainer rings arranged at opposite sides of the bearing and positioned adjacent the outer ends of said rollers, hub portions of reduced diameter integral with the outer ends of said rollers and adapted to project into a plurality of spaced radial slots extending inwardly from the outer peripheral edge of the retainer ring adjacent thereto, the retainer rings, at the opposite sides of each slot, having opposed concave surfaces between which a hub portion is disposed, the periphery of each hub portion being rounded transversely to provide a peripheral convex surface, the maximum spacing between any pair of said opposed concave surfaces being slightly greater than the maximum diameter of a hub portion.

2. In a roller bearing having inner and outer race rings, a plurality of pairs of rollers arranged between said race rings, the rollers in each pair being mounted side by side and having rolling contact with each other at their inner ends, a pair of retainer rings arranged at opposite sides of the bearing and positioned adjacent the outer ends of said rollers, hub portions of reduced diameter integral with the outer ends of said rollers and adapted to project into a plurality of spaced radial slots extending inwardly from the outer peripheral edge of the retainer ring adjacent thereto, the retainer rings, at the opposite sides of each slot, having opposed concave surfaces between which a hub portion is disposed, the periphery of each hub portion being rounded transversely to provide a peripheral convex surface, the maximum spacing between any pair of said opposed concave surfaces being slightly greater than the maximum diameter of a hub portion, there being a space between the convex peripheral surface of each hub portion and the lower end of the slot associated therewith, whereby each hub portion may contact the retainer ring associated therewith at only one point.

3. In a roller bearing having inner and outer race rings, a plurality of pairs of rollers arranged between said race rings, the rollers in each pair being mounted side by side and having rolling contact with each other at their inner ends, a pair of retainer rings arranged at opposite sides of the bearing and positioned adjacent the outer ends of said rollers, hub portions of reduced diameter integral with the outer ends of said rollers and adapted to project into a plurality of spaced radial slots extending inwardly from the outer peripheral edge of the retainer ring adjacent thereto, the retainer rings, at the opposite sides of each slot, having opposed concave surfaces between which a hub portion is disposed, the periphery of each hub portion being rounded transversely to provide a peripheral convex surface, the maximum spacing between any pair of said opposed concave surfaces being slightly greater than the maximum diameter of a hub portion, there being a space between the convex peripheral surface of each hub portion and the lower end of the slot associated therewith, whereby each hub portion may contact the retainer ring associated therewith at only one point, the radius of curvature of said concave slot surfaces being greater than that of the radius of curvature or each convex hub portion surface.

4. A roller bearing comprising outer and inner race rings, a plurality of pairs of rollers arranged between said race rings and having peripheral contact therewith, the inner end of each roller being of conical formation to provide a conical surface, the conical surfaces of the two rollers in each pair having contact with each other, the outer ends of said rollers being reduced in diameter to provide hub portions, each of said hub portions having a transversely rounded convex peripheral surface, and retainer rings for maintaining adjacent pairs of rollers in spaced-apart relationship, said retainer rings having radial slots formed therein to receive said hub portions, the side edges of said slots being beveled inwardly toward each other.

JOHN WILLIAM FOLEY.

REFERENCES CITED

The following references are of record in the file of this patent:

UNITED STATES PATENTS

| Number | Name | Date |
|---|---|---|
| 1,418,277 | Birgh | June 6, 1922 |